UNITED STATES PATENT OFFICE.

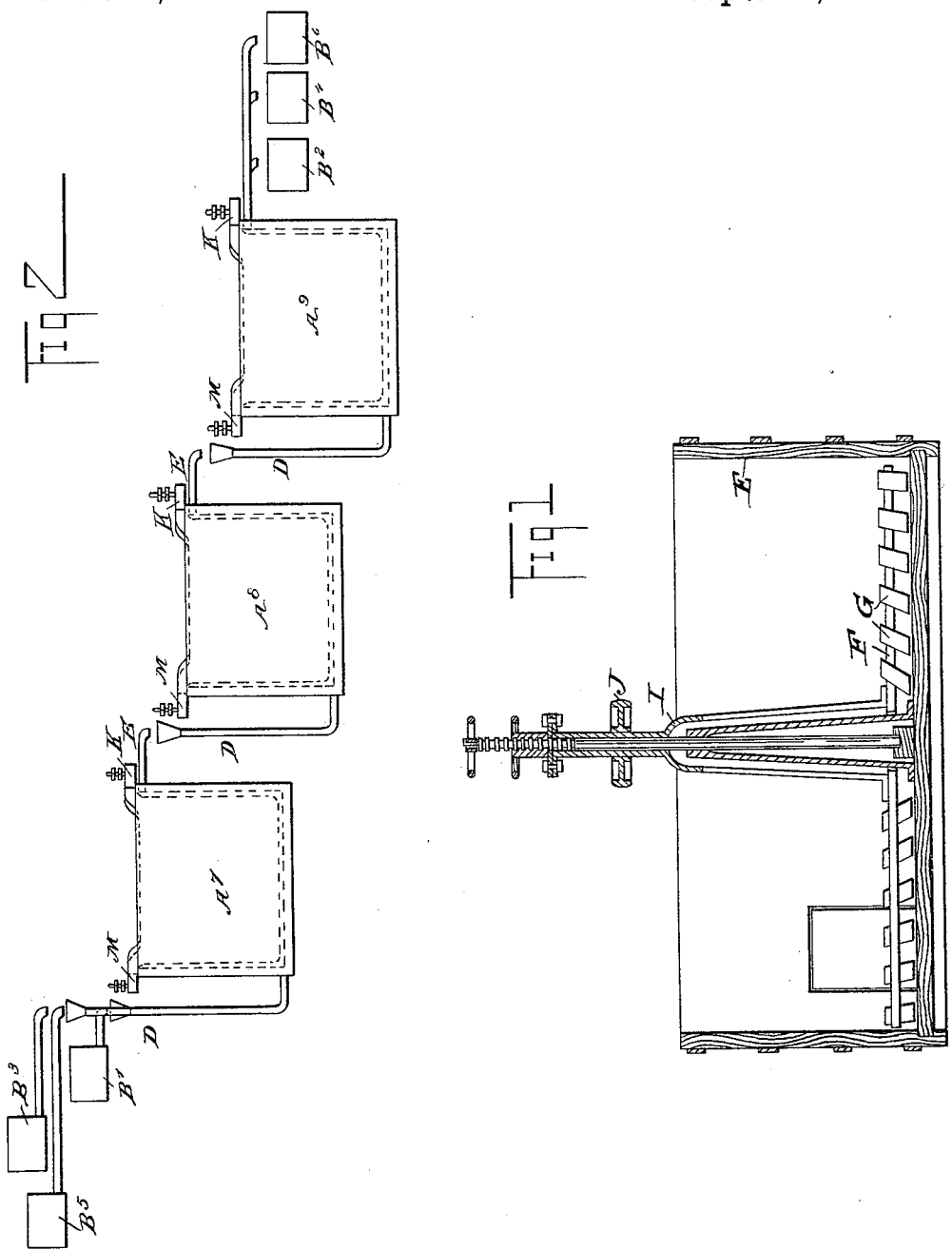

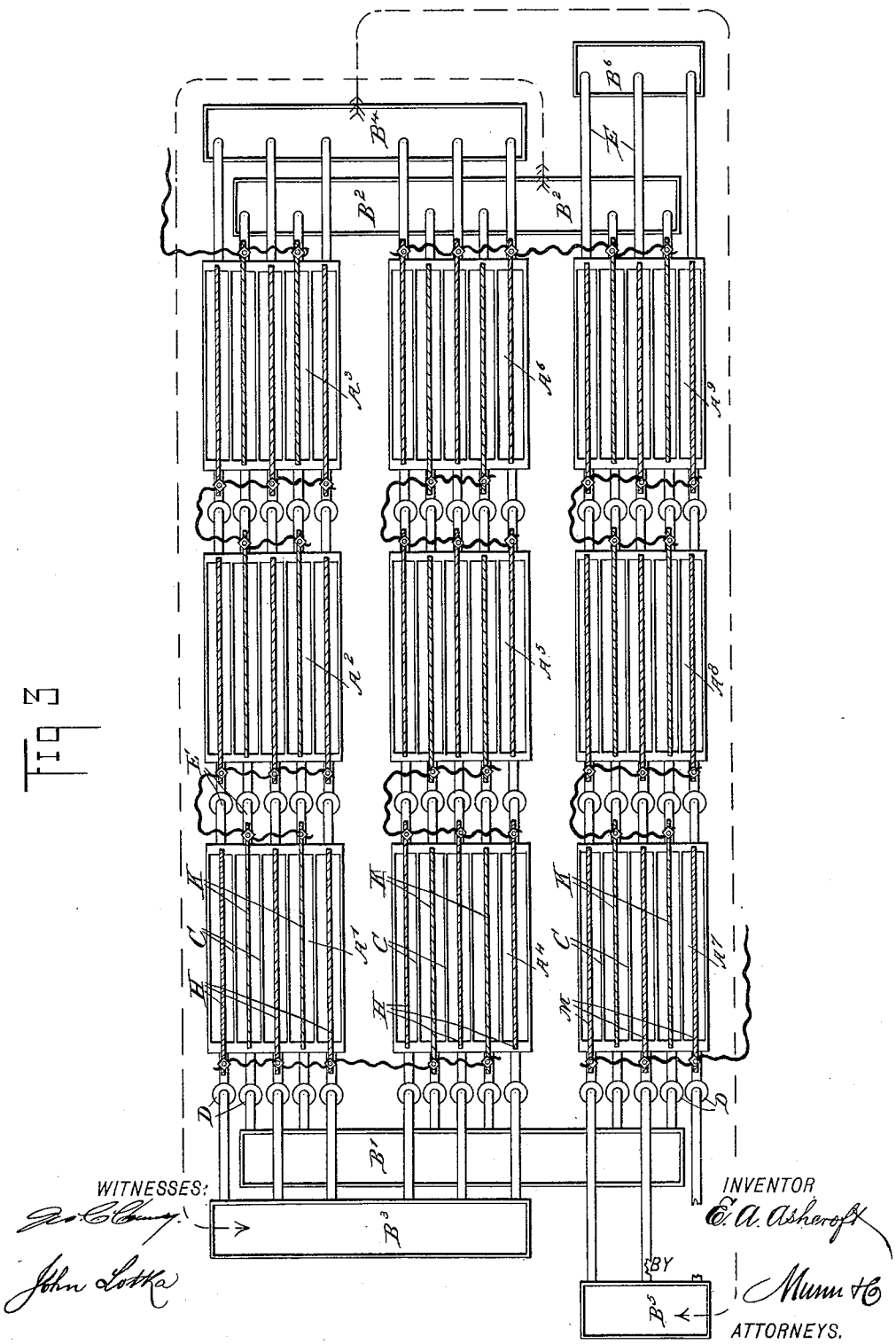

EDGAR ARTHUR ASHCROFT, OF BROKEN HILL, NEW SOUTH WALES.

PROCESS OF TREATING ZINC-BEARING ORES.

SPECIFICATION forming part of Letters Patent No. 546,873, dated September 24, 1895.

Application filed August 17, 1894. Serial No. 520,744. (No specimens.)

*To all whom it may concern:*

Be it known that I, EDGAR ARTHUR ASHCROFT, electrical engineer, of Himalaya, Thomas Street, Broken Hill, in the Colony of New South Wales, do hereby declare the nature of my invention for an improved process for the treatment of zinc-bearing ores and zinc-bearing products, particularly applicable to those containing zinc and lead sulphides, and in what manner the same is to be performed, to be particularly described and ascertained in and by the following statement.

My invention relates to an improved process to be used in the combined electrolytic and leaching treatment of ores and products, particularly those containing admixtures of zinc and lead in the form of sulphides, with or without silver, gold, copper, or other constituents, and having special reference to the sulphide ores occurring at Broken Hill, New South Wales, Nevada, United States of America, and elsewhere, which consist for the most part of a mixture of argentiferous zinc-blende and argentiferous galena, with more or less silica and other constituents, and are known as "sulphide ores."

My invention is also suitable for the treatment of zinc-oxide ores or admixtures of zinc oxide with any matrix which has no objectionable influence on the various operations, or for the treatment of ores or products containing zinc in any form which can be readily converted into zinc oxide.

The special features of my process consist in, first, oxidizing such ores or products as require it by roasting; second, leaching the oxidized ore or product with a solution containing a ferric salt, as hereinafter described, whereby zinc is obtained in solution from the ore and the iron from the solution is precipitated and remains with the residues, and, third, electrolyzing the resulting zinc solution in the manner and with the materials hereinafter described, whereby the application of electrolysis is secured at a cost very much below anything heretofore obtained, the zinc is deposited, the leaching solution is regenerated, and great economy is effected in the materials employed or required for leaching, electrolyzing, and otherwise treating the ore.

In carrying my improved process into effect the ore or product may either be treated without previous mechanical separation, and at the most economically suitable locality, or it may be subjected to mechanical separation or concentration, whereby more suitable products for operating on may be produced. For instance, in the case of some of the Broken Hill ores concentration may be employed to produce two products, one high in lead and low in zinc and one high in zinc and low in lead, and at the same time to eliminate a portion of the gangue. The zinc product may then be treated by leaching the ore, after roasting, and electrolyzing the resulting solution, as herein described, while the lead concentrates may be smelted with the iron-bearing residues from such treatment, and in this manner the whole of the silver, lead, and zinc, less small and unavoidable losses, may be recovered.

The ore or product from which the zinc is to be extracted, if it contains sulphur, is first subjected to a preliminary oxidizing roast, whereby the zinc sulphide contained therein is converted as far as possible to neutral or basic zinc sulphate and zinc oxide, the lead sulphide also undergoing oxidation more or less completely. For the purpose of this roast any of the well-known forms of reverberatory or mechanical roasting-furnaces may be employed. The ore or product is preferably ground to extreme fineness, either before or immediately after roasting. The leaching solution, having the composition hereinafter described in the chemical portion of this specification, is then introduced into a circular vat of large capacity and provided with means for thoroughly stirring the contents. Into a given quantity of this solution a suitable quantity of oxidized and ground ore or product is introduced and stirred for from half an hour to two hours, the quantity being calculated so that when sufficient zinc has been extracted from the ore to render the residue of a convenient composition for subsequent smelting the solution will be freed from iron. For instance, with ores containing thirty per cent. of zinc probably some five per cent. would preferably be allowed to remain in the residues on account of the higher cost of total extraction. When the leaching is complete, the solution and the residues are separated by settling and decantation or by filter-pressing, and the residues may be washed with a small quantity of water, which wash-water or portions of it may subsequently be added to the solution to compensate for water lost by evaporation. The residues are then, after drying, found in the form of a homogeneous and somewhat pasty mass containing the lead, (in the form of sulphates and oxides,) the greater part of the silver, the gangue, and the iron, which has been precipitated from the solution in the form of ferric hydrate. The residues are now fit for smelting, but may, if desired, be further improved in several ways—namely, by making into bricks for convenience of handling and reduction of loss in the furnaces with or without the addition of quicklime, which will cause the mass to set much harder together and is afterward available as flux in the furnace or the residues may, if desired, be heated to a dull red heat, which drives off the water of hydration from the ferric hydrate and agglomerates the particles of the mass together, at the same time reducing the weight of the mass which has to be smelted. The solution, after being separated from the residues, may be found to contain various foreign matters taken from the ore—such, for instance, as a small quantity of silver, gold, copper, antimony, arsenic, manganese, alumina, silica, and others, according to the composition of the ore under treatment, also a small quantity of iron in the form of soluble ferric hydrate—which foreign matters I prefer to remove, as hereinafter described, before proceeding with my process. The silver, gold, copper, antimony, and arsenic, together with any other metal belonging to the same group, may be precipitated and recovered by the action of metallic zinc applied in any of the well-known ways. Manganese, if desired, may be removed by precipitating it from the boiling solution by means of permanganate of potash and zinc oxide, according to the well-known reaction employed by chemists for the estimation of manganese in solution. Alumina may similarly be removed, if desired, by known chemical means, while the silica, together with the soluble ferric hydrate, is readily precipitated on boiling the solution, or will separate out on standing for a certain time. Although I have just described in what manner these foreign matters may be removed from the solution, it is not found necessary in practice to remove all the above impurities after every leaching operation. The silver, gold, copper, antimony, arsenic, &c., having been recovered by metallic zinc and the iron and silica removed by once boiling the solution, the manganese, alumina, &c., may be allowed to remain until they have accumulated in inconvenient quantities through the successive passage of the solution over fresh quantities of ore, and may then, if desired, be removed. The solution having been brought to the condition indicated is now ready to be treated in the zinc-electrodepositing plant, where the zinc is recovered and the solution is recharged with a sufficiency of ferric salts for a repetition of the above-described operation of leaching.

The electrodepositing plant consists, essentially, of a number of depositing-vats provided with metallic iron anodes and suitable cathodes (preferably zinc plates) and a number of similar vats having anodes of insoluble material, such as carbon, the total depositing capacity of the plates in the iron-anode vats being about twice that of the carbon-anode vats. In these vats I prefer to place diaphragms of suitable porous material between the anode and the cathode plates, thereby dividing each vat into a number of separate cells in which separate liquids may be employed without intermingling.

The particular form or construction of the depositing-vats or of the leaching-vats above mentioned is not material to my process; but one construction of apparatus which I have found suitable and useful is shown in the accompanying drawings. Any suitable number of such sets of apparatus may be employed, and the connection and arrangement of the same may be designed to suit varying conditions and requirements.

Figure 1 is a section of a leaching-vat with stirrers. Fig. 2 shows the arrangement of depositing-vats in a cascade and the reservoirs. Fig. 3 is a general plan of the electrolysis plant.

The leaching-vat shown in Fig. 1 consists of a plain round vat E, provided with stirring appliances F. These may be a number of shoes or prongs G, fastened to a suitable frame I, upon the upper portion of which is a pulley J, which may be driven by a belt from any convenient motive power. The vat is charged from the top, and suitable outlets are provided for withdrawing the contents.

The electrodepositing-vats are arranged in such a manner and with such pipe and through connections between them that a continual circulation of three separate batches of solution is maintained in the system, the liquids being circulated at sufficient speed to insure a brisk and continual motion at every part of the plates.

The depositing plant consists of a series of electrolysis-vats $A'$ $A^2$ $A^3$ $A^4$ $A^5$ $A^6$ $A^7$ $A^8$ $A^9$, preferably arranged as shown in Figs. 2 and 3, and a number of reservoirs $B'$ $B^2$ $B^3$ $B^4$ $B^5$ $B^6$. Each of the vats is divided by diaphragms C, of filter-cloth or other suitable material, into a number of compartments, each of which has an inlet-pipe with a funnel D entering near the bottom and an outlet-pipe $E'$, discharging near the top of the compartment. Each of the vats $A'$ $A^2$ $A^3$ $A^4$ $A^5$ $A^6$ contains three iron anodes H and two zinc cathodes K, while each of the vats $A^7 A^8 A^9$ contains three carbon anodes M and two zinc cathodes K. The electrical connections may be made in any suitable manner. As shown in the drawings, all the plates in one vat are connected in parallel and all the vats in series. The reservoir B' has a number of exit-pipes which discharge into the funnels of the cathode-compartments of the three top vats A', A⁴, and A⁷. The outlet-pipes of these compartments discharge into the funnels of the cathode-compartments of the vats A², A⁵, and A⁸. The outlet-pipes of these compartments discharge into the funnels of the cathode-compartments of the vats A³, A⁶, and A⁹, and the outlet-pipes of these compartments discharge into the reservoir B². The reservoir B³ has a number of exit-pipes which discharge into the funnels of the iron-anode compartments of the vats A' and A⁴. The outlet-pipes of these compartments discharge into the funnels of the iron-anode compartments of the next vats A² and A⁵. The outlet-pipes of these compartments discharge into the iron-anode compartments of the vats A³ and A⁶, and the outlet-pipes of these compartments discharge into the reservoir B⁴. The reservoir B⁵ has exit-pipes which discharge into the funnels of the carbon-anode compartments of the vat A⁷. The outlet-pipes of these compartments discharge into the funnels of the carbon-anode compartments of the vat A⁸. The outlet-pipes of these compartments discharge into the funnels of the carbon-anode compartments of the vat A⁹, and the outlet-pipes of these compartments discharge into the reservoir B⁶.

The pumps for raising the solutions from the reservoir B² to the reservoir B³, from the reservoir B⁴ to the reservoir B⁵, as indicated by the arrows on Fig. 3, and from the reservoir B⁶ to the leaching-vat again may be of any suitable construction and materials, and the reservoirs preferably communicate with larger storage-tanks. The three batches of solution thus circulating consist of portions of the same stock solution, each undergoing different stages of the operations. That circulating around the zinc cathodes must be the solution of the zinc salts, freed from iron or other harmful impurities, which has been obtained by leaching the ores, and subsequently purifying, if necessary, as hereinbefore described. The solution circulating around the iron anodes is a similar lot of solution which has been previously used around the zinc cathodes and has thus become more or less depleted of its zinc. It is circulated around the iron anodes until a sufficient quantity of iron has gone into solution as ferrous salt to impart the proper strength for a subsequent leaching solution. The solution circulating around the carbon anodes is a solution which has formerly circulated around the iron anodes, as above described. It is circulated around the carbon anodes until all the iron it contains has been converted from the ferrous to the ferric state. It will thus be observed that at each change of the solution the old catholyte of both iron and carbon anode vats becomes the new anolyte of the iron-anode vats, the old anolyte of the iron-anode vats becomes the new anolyte of the carbon vats, the old anolyte of the latter becomes the new leaching solution, the old leaching solution, after purifying, if necessary, becomes the new zinc-bearing solution and catholyte of both iron and carbon anode vats, and so the cycle is complete. The periods at which such changes are made will depend upon various circumstances, mainly on the amount of the iron which it is found convenient to impart to the solution and the amount of zinc to remove therefrom at each cycle.

It will be seen from the chemical reactions hereinafter described that for the complete and continuous operation of this process two iron anodes are required to one carbon-anode vat of equal depositing capacity.

A study of the above-described conditions of working will show that the process is continuous and that each portion of the solution passes through a cycle of operations. Thus, beginning with a ferric solution containing more or less zinc and acting on the oxidized ore, the operations are as follows: first, leaching, whereby iron is thrown out of solution and zinc substituted; second, circulation past the cathodes in the zinc-electrode depositing plant, where the excess of zinc is taken out; third, circulation past the iron anodes, where ferrous salts are imparted to the solution; fourth, circulation past the carbon anodes, where the ferrous salts are oxidized to ferric salts and the solution thereby regenerated and ready to be again employed for leaching.

The use of iron anodes, as above described, and also the use of carbon anodes surrounded by ferrous salts, besides affording an economical means of obtaining iron salts in the solution for leaching the ore with, prevents entirely or reduces the amount of acids set free in the solution by electrolysis, (also the polarization accompanying the formation of such acids,) and which if allowed to remain and come in contact with cathode-plates would render the continuous deposition of the zinc impracticable. The useful purpose of very materially reducing the energy required to decompose the zinc salts is also served. The energy represented by the solution of the iron in the iron-anode vats and its higher oxidation in the carbon-anode vats approaches very closely to the total energy required to separate the equivalent amount of zinc at the cathodes. For this reason the production of zinc by this process is unhampered by technical irregularities and requires very much less electrical power than by any hitherto employed electrolysis process, and the first cost of the electrolysis plant is proportionately reduced.

For the soluble iron anodes, cast, wrought, or scrap iron or steel may be used. For the insoluble anodes gas-retort carbon, prepared carbon, platinum, ferro-silicon, or any other known and suitable substances may be employed.

For the diaphragms any of the known porous materials used for electrolysis may be employed, as will be readily understood by all persons versed in the art to which this invention appertains. The material employed in the vats illustrated in the drawings herewith is "filter-cloth."

For the cathode-plates almost any material may be used; but I prefer to employ sheets of zinc, which may be melted up in a melting-pot with the deposits obtained or may be stripped and used again and again.

For the above-described operations one of several solutions of different though analogous compositions may be employed, according to varying circumstances.

No. 1. Zinc chloride mixed with sodium, potassium, magnesium, or ammonium sulphate.

No. 2. Zinc chloride mixed with sodium, potassium, magnesium, or ammonium chloride.

No. 3. Zinc sulphate mixed with sodium, potassium, magnesium, or ammonium sulphate.

The ferric salt required in each of the above solutions in order to effect the leaching of zinc from the ores is generated in the electro-depositing plant, as hereinbefore described, the iron being first imparted by the iron anodes in the ferrous state and subsequently oxidized to the ferric state.

The strength and the temperature at which the above solutions are employed are not material and may vary between very wide limits. The solution which I generally prefer to employ is the No. 1 solution. This solution contains from ten to fifty grams of zinc per liter as zinc chloride (which is, however, partially displaced in the electrolysis by the iron salt, as above mentioned) and from twenty to fifty grams of sodium sulphate. The chemical reactions with this solution are as follows, and as they are typical of the reactions with the other solutions it will be unnecessary to describe the latter:

*Electrolysis in Two Vats with Iron Anodes.*

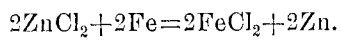
$$2ZnCl_2 + 2Fe = 2FeCl_2 + 2Zn.$$

*Electrolysis in One Vat with Insoluble Anodes.*

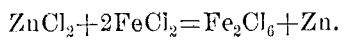
$$ZnCl_2 + 2FeCl_2 = Fe_2Cl_6 + Zn.$$

In the above reactions the sodium sulphate, in so far as relates to this process, is unchanged.

*Leaching.*

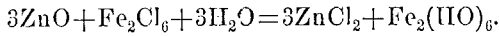
$$3ZnO + Fe_2Cl_6 + 3H_2O = 3ZnCl_2 + Fe_2(HO)_6.$$

The lead salts are at the same time more or less converted into lead chloride by a similar reaction, and the lead chloride so produced will react with the sodium sulphate in solution to form insoluble lead sulphate, and thus prevent lead from going into solution, thus:

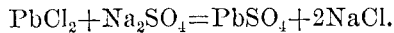
$$PbCl_2 + Na_2SO_4 = PbSO_4 + 2NaCl.$$

The small quantities of sodium chloride so formed, together with the small quantities of zinc sulphate (basic and neutral) formed in roasting the ore, will further react to re-form sodium sulphate and zinc chloride on boiling the solution, which also throws out the soluble ferric hydrate and silica, as hereinbefore mentioned. When the No. 2 solution is employed, sulphates not being present, any lead chloride formed will remain unaltered, and, this salt being slightly soluble, it may be necessary to remove the lead from solution in any well-known manner.

Having now particularly described and ascertained the nature of my said invention and in what manner the same is to be performed, I declare that what I claim is—

1. The herein described process for the treatment of zinc bearing ores and zinc bearing products, which consists in first leaching the oxidized ore with a solution containing a ferric salt, to precipitate the iron from said solution and dissolve the zinc, secondly electrolyzing the resulting zinc bearing solution by first passing it around metallic cathodes to precipitate the zinc from the said zinc bearing solution, and then around iron anodes to impart a ferrous salt to the solution, and subsequently raising the ferrous salt to the ferric state and thereby regenerating the original ferric salt solution, substantially as described.

2. In the treatment of zinc bearing ores and zinc bearing products passing a zinc bearing solution first around the zinc cathodes then around the iron anodes and subsequently around the carbon or other insoluble anodes of an electrolytic system of vats, substantially as and for the purpose specified.

3. In the treatment of zinc bearing ores and zinc bearing products passing a zinc bearing solution first around the zinc cathodes then around the iron anodes and subsequently oxidizing the said solution, substantially as and for the purpose specified.

4. The herein described process for the treatment of zinc bearing ores and zinc bearing products, which consists in first leaching the oxidized ore with a solution containing a ferric salt, to precipitate the iron from said solution and dissolve the zinc, secondly electrolyzing the resulting zinc bearing solution by first passing it around metallic cathodes to precipitate the zinc from the said zinc bearing solution, and then around iron anodes to impart a ferrous salt to the solution subsequently raising the ferrous salt to the ferric state and finally returning the regenerated ferric salt solution to the leaching apparatus, substantially as described.

5. In the treatment of zinc bearing ores and zinc bearing products, the method of precipitating the zinc and supplying a ferrous salt to the zinc-bearing solution, which consists in first leaching the oxidized ore, then passing the said solution first around the cathodes of an electrolytic vat, to precipitate the zinc on the said cathodes, and then around the iron anodes of the said vat, to impart a ferrous salt to the solution, substantially as described.

6. The process of preparing a solution suitable for leaching zinc bearing ores or zinc bearing products, which consists in passing a zinc bearing solution first around the metallic cathodes of an electrolytic apparatus, then around iron anodes of the said electrolytic apparatus, to impart a ferrous salt to the zinc bearing solution, and finally around insoluble anodes, to raise the ferrous salt to the ferric state, substantially as described.

7. The process of preparing a solution suitable for leaching zinc bearing ores or zinc bearing products, which consists in passing a zinc bearing solution first around the iron anodes of an electrolytic apparatus, to impart a ferrous salt to the zinc bearing solution, and then around insoluble anodes, to raise the ferrous salt to the ferric state, substantially as described.

8. In the treatment of zinc bearing ores and zinc bearing products, the herein-described method of simultaneously depositing zinc from a catholyte free from iron, and raising a ferrous salt solution to the ferric state, which consists in passing the zinc bearing solution, free from iron, around the metallic cathodes of an electrolytic apparatus, and simultaneously passing the ferrous salt solution around the insoluble anodes of the said electrolytic apparatus, substantially as and for the purpose specified.

In testimony that I claim the foregoing as my invention I have signed my name, in presence of two witnesses, this 6th day of June, 1894.

EDGAR ARTHUR ASHCROFT.

Witnesses:
ARTHUR FRANK ABBOTT,
OSCAR HAROLD VINCENT BERRIMAN.